(12) United States Patent
Liao

(10) Patent No.: US 10,901,232 B2
(45) Date of Patent: Jan. 26, 2021

(54) DISPLAY DEVICE AND DISPLAY METHOD

(71) Applicant: Au Optronics Corporation, Hsinchu (TW)

(72) Inventor: Ren-Wei Liao, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/510,991

(22) Filed: Jul. 15, 2019

(65) Prior Publication Data

US 2020/0218079 A1 Jul. 9, 2020

(30) Foreign Application Priority Data

Jan. 9, 2019 (TW) .............................. 108100850 A

(51) Int. Cl.
G02B 30/27 (2020.01)
H04N 13/31 (2018.01)

(52) U.S. Cl.
CPC ............. *G02B 30/27* (2020.01); *H04N 13/31* (2018.05)

(58) Field of Classification Search
CPC ................................ G02B 30/27; H04N 13/31
USPC .......................................................... 348/51
See application file for complete search history.

(56) References Cited

U.S. PATENT DOCUMENTS

| 7,154,653 | B2 | 12/2006 | Kean et al. |
| 9,638,925 | B2 | 5/2017 | Wei |
| 9,781,407 | B2 | 10/2017 | Watanabe et al. |
| 2004/0218245 | A1* | 11/2004 | Kean ...................... G02B 30/27 359/232 |
| 2005/0244050 | A1* | 11/2005 | Nomura ........... H04N 21/21805 382/154 |
| 2008/0002255 | A1* | 1/2008 | Tavor ..................... G02B 30/27 359/464 |
| 2013/0113785 | A1* | 5/2013 | Sumi ...................... H04N 13/31 345/419 |
| 2013/0335463 | A1 | 12/2013 | Chiang et al. |
| 2014/0078268 | A1* | 3/2014 | Watanabe ............ H04N 13/305 348/54 |
| 2016/0246065 | A1 | 8/2016 | Wei |
| 2019/0187483 | A1 | 6/2019 | Luo et al. |
| 2019/0353916 | A1* | 11/2019 | Koito ................ G02F 1/133512 |

FOREIGN PATENT DOCUMENTS

| CN | 1261797 | 6/2006 |
| CN | 103562775 | 2/2014 |
| CN | 104111538 | 10/2014 |
| CN | 106896514 | 6/2017 |
| CN | 107436500 | 12/2017 |
| TW | 201400874 | 1/2014 |

* cited by examiner

*Primary Examiner* — James T Boylan
(74) *Attorney, Agent, or Firm* — JCIPRNET

(57) ABSTRACT

A display device and a display method are provided. The display device includes a plurality of repeat units and an optical layer. Each of the repeat units includes a plurality of display elements displaying a same object with different parallaxes. At least two of the display elements displaying the same object with the closest parallax are not connected with each other. The optical layer is disposed on the repeat units. The optical layer having a plurality of light transmission areas and a light non-transmission area around the light transmission areas. Each of the repeat units overlaps with two or more light transmission areas.

12 Claims, 3 Drawing Sheets

DISPLAY DEVICE AND DISPLAY METHOD

CROSS-REFERENCE TO RELATED APPLICATION

This application claims the priority benefit of Taiwan application serial no. 108100850, filed on Jan. 9, 2019. The entirety of the above-mentioned patent application is hereby incorporated by reference herein and made a part of this specification.

BACKGROUND

Field of the Invention

The invention relates to a display device and a display method and more particularly, to a display device including a plurality of display elements displaying a same object with different parallaxes and a display method using the display device.

Description of Related Art 3D display technology has been the focus of many display manufacturers. In comparison with a 2D image, a 3D image can facilitate enhancing a viewer's immersion more easily for the viewer to experience vividly. A current 3D display device usually has display elements (e.g., pixels or sub-pixels) on which an optical layer having openings is disposed. Each of the openings in the optical layer corresponds to a plurality of display elements displaying a same object with different parallaxes. However, the openings of the optical layer limit a resolution of the 3D display device, and in comparison with an ordinary display device without the optical layer disposed, the resolution of the 3D display device disposed with the optical layer is usually dramatically reduced.

SUMMARY

The invention provides a display device capable of improving the issue of insufficient 3D image resolution.

The invention provides a display method capable of improving the issue of insufficient 3D image resolution.

At least one embodiment of the invention provides a display device. The display device includes a plurality of repeat units and an optical layer. Each of the repeat units includes a plurality of display elements displaying a same object with different parallaxes. At least two of the display elements displaying the same object with the closest parallax are not connected with each other. The optical layer is disposed on the repeat units. The optical layer having a plurality of light transmission areas and a light non-transmission area around the light transmission areas. Each of the repeat units overlaps with two or more light transmission areas.

At least one embodiment of the invention provides a display method. The display method includes providing a display device and displaying an object. The display device includes a plurality of repeat units and an optical layer. Each of the repeat units includes a plurality of display elements. The optical layer is disposed on the repeat units. The optical layer has a plurality of light transmission areas and a light non-transmission area around the light transmission areas. Each of the repeat units overlaps with two or more light transmission areas. The display elements in each of the repeat units display a same object respectively with different parallaxes. At least two of the display elements displaying the same object with the closest parallax are not connected with each other.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
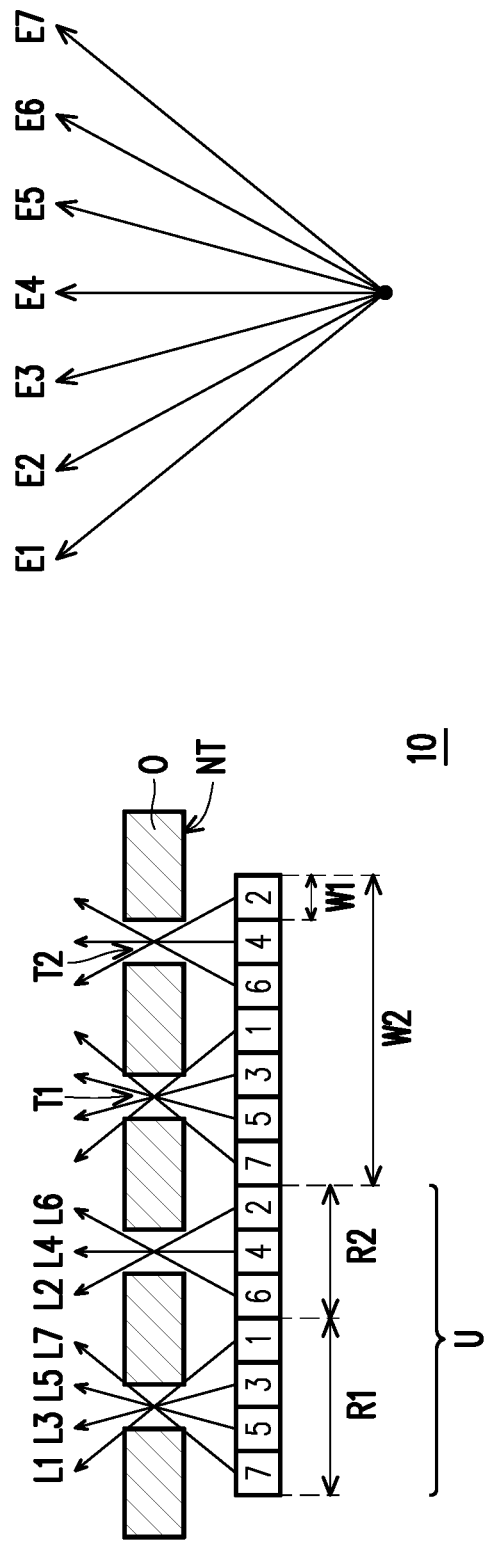
FIG. 1 is a schematic cross-sectional diagram illustrating a display device according to an embodiment of the invention.

FIG. 1 is a schematic cross-sectional diagram illustrating a display device according to an embodiment of the invention.

Referring to FIG. 1, the display device 10 includes a plurality of repeat units U and an optical layer O. The optical layer O is disposed on the repeat units U. FIG. 1 illustrates the display device 10 including two repeat units U as an example, but the invention is not limited thereto. The number of the repeat units U is determined based on an actual demand. In some embodiments, there are other layers (not shown) further sandwiched between the optical layer O and the repeat units U, but the invention is not limited thereto. The optical layer O has a plurality of light transmission areas and a light non-transmission area NT around the light transmission areas. Each of the repeat units U overlaps with two or more light transmission areas. In the present embodiment, the light transmission areas include a first light transmission area T1 and a second light transmission area T2, and each of the repeat units U overlaps with the first light transmission area T1 and the second light transmission area T2.

Each of the repeat units U includes a plurality of display elements displaying a same object with different parallaxes. For example, each of the repeat units U includes a first display element to an $n^{th}$ display element, and the first display element to the $n^{th}$ display element display the same object with gradually changing parallaxes, wherein n is a positive integer. In the present embodiment, n is an odd number, for example, n is 7. Each of the repeat units U includes a first display element 1 to a seventh display element 7 displaying a same object with different parallaxes. The first display element 1 to the seventh display element 7 of each of the repeat units U is capable of displaying the same object with different view angles. For example, the first display element 1 to the seventh display element 7 display a point on an object respectively with different view angles.

In the present embodiment, the first display element 1 to the seventh display element 7 are, for example, pixels or sub-pixels. For example, the first display element 1 to the seventh display element 7 may be sub-pixels respectively displaying single colors or may also be pixels respectively including red, blue and green sub-pixels.

At least two of the display elements displaying a same object I with the closest parallax are not connected with each other. In the present embodiment, the second display element 2 and the first display element 1 display the same object with the closet parallax, and so do the second display element 2 and the third display element 3, wherein the second display element 2 and the first display element 1 are not connected with each other, and the second display element 2 and the third display element 3 are not connected with each other. The fourth display element 4 and the third display element 3 display the same object with the closet parallax, and so do the fourth display element 4 and the fifth display element 5, wherein the fourth display element 4 and the third display element 3 are not connected with each other, and the fourth display element 4 and the fifth display element 5 are not connected with each other. The sixth display element 6 and the fifth display element 5 display the same object with the closet parallax, and so do the sixth display element 6 and the seventh display element 7, wherein the sixth display element 6 and the fifth display element 5 are not connected with each other, and the sixth display element 6 and the seventh display element 7 are not connected with each other.

In the present embodiment, each of the repeat units U includes a first region R1 and a second region R2. The first region R1 is adjacent to the second region R2. The number of the display elements located in the first region R1 is an even number, and the number of the display elements located in the second region R2 is an odd number. The odd-numbered display elements are sequentially disposed in the first region R1. For example, the first display element 1, the third display element 3, the fifth display element 5 and the seventh display element 7 are sequentially disposed in the first region R1. The even-numbered display elements are sequentially disposed in the second region R2. For example, the second display element 2, the fourth display element 4 and the sixth display element 6 are sequentially disposed in the second region R2.

A width W2 of each of the repeat units U is approximately equal to a sum of a width W1 of each of the display elements in each of the repeat units U. In the present embodiment, each of the repeat units U includes the first display element to the seventh display element 7, the width W1 of each of the first display element to the seventh display element 7 is equal to each other, and the width W2 of each of the repeat units U is approximately equal to 7 times of the width W1.

In the present embodiment, a center of the first region R1 overlaps with a center of the first light transmission area T1, a center of the second region R2 overlaps with a center of the second light transmission area T2, and a center of each of the repeat units U does not overlap with the center of the first light transmission area T1 and the center of the second light transmission area T2. In the present embodiment, a distance between the center of the first light transmission area T1 and the center of the second light transmission area T2 is a half of the width W2. In other words, in the present embodiment, a pitch of the light transmission areas is a half of the width W2 of each of the repeat units U.

In the present embodiment, the first display element to the seventh display element respectively emit lights L1 to L7. After the light L1, the light L3, the light L5 and the light L7 emitted by the first display element 1, the third display element 3, the fifth display element 5 and the seventh display element 7 pass through the first light transmission area T1, the light L1, the light L3, the light L5 and the light L7 respectively move forward along a direction E1, a direction E3, a direction E5 and a direction E7. After the light L2, the light L4 and the light L6 emitted by the second display element 2, the fourth display element 4 and the sixth display element 6 pass through the second light transmission area T2, the light L2, the light L4 and the light L6 respectively move forward along a direction E2, a direction E4 and a direction E6. The directions E1 to E7 are different from one another. In the present embodiment, after the display device 10 is provided, the first display element 1 to the seventh display element 7 display the same object with different parallaxes, thereby obtaining 3-dimensional (3D) stereoscopic image information. In the present embodiment, the first display element 1 to the seventh display element 7 display the same object with gradually changing parallaxes, and the directions E1 to E7 are light-emitting directions with gradually changing light-emitting angles.

Based on the above, each of the repeat units U of the display device 10 includes the first display element 1 to the seventh display element 7 displaying the same object with different parallaxes, and one repeat unit U overlaps with two or more light transmission areas, and in comparison with another display device in which one repeat unit overlaps with only one light transmission area, the display device 10 of the present embodiment has a higher resolution.

Figure 2:
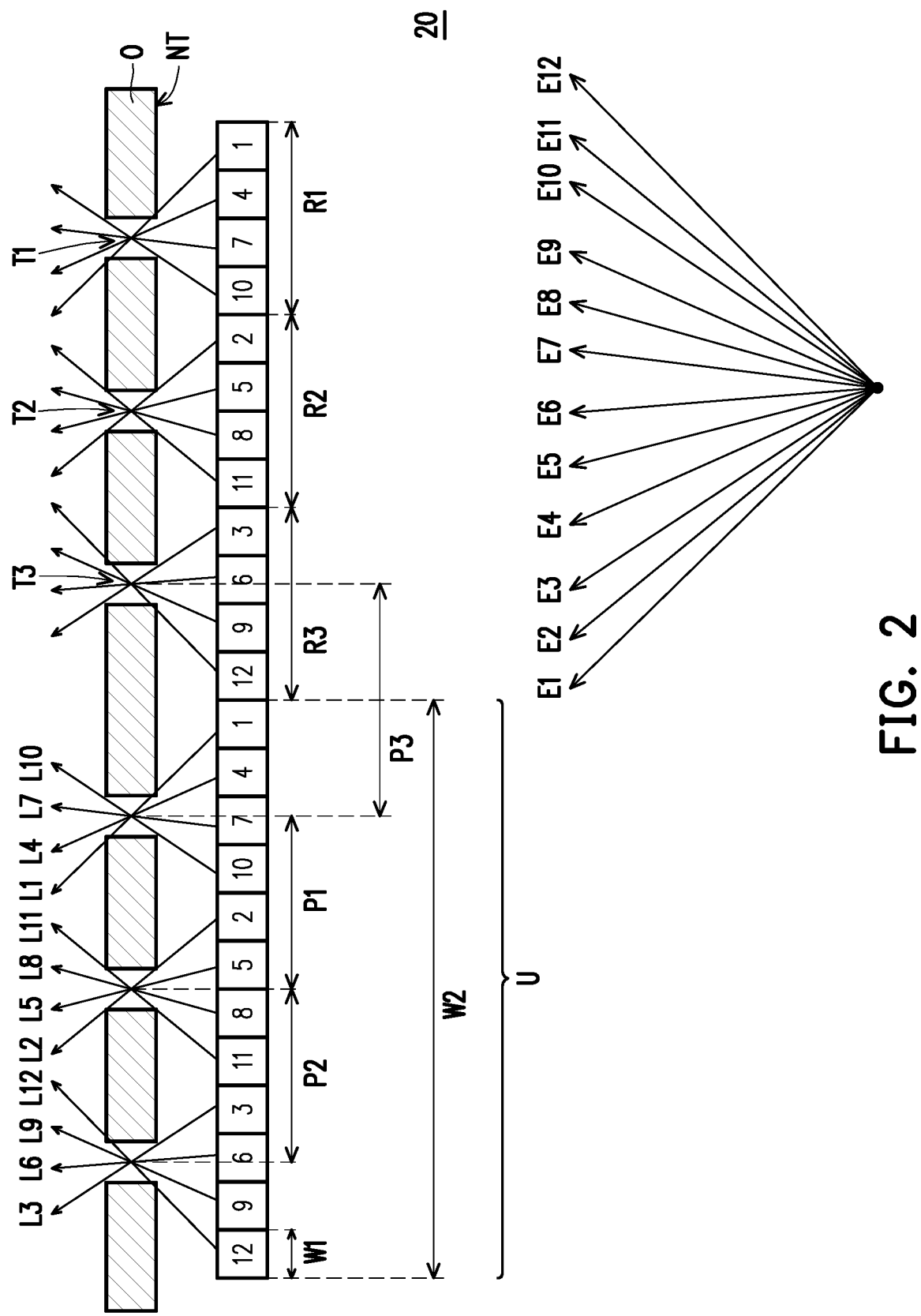
FIG. 2 is a schematic cross-sectional diagram illustrating a display device according to an embodiment of the invention.

FIG. 2 is a schematic cross-sectional diagram illustrating a display device according to an embodiment of the invention. It should be noted that element numbers and part of the contents related to the previous embodiment illustrated in FIG. 1 are referenced in the present embodiment illustrated in FIG. 2, where the same or similar elements are represented by using the same or similar reference numerals, the description with respect to the same technical content is omitted. Regarding the detailed description of the omitted parts, reference may be found in the previous embodiment and will not be repeated below.

Referring to FIG. 2, in a display device 20, light transmission areas include a first light transmission area T1, a second light transmission area T2 and a third light transmission area T3, and each of the repeat units U overlaps with the first light transmission area T1, the second light transmission area T2 and the third light transmission area T3.

Each of the repeat units U includes a plurality of display elements displaying a same object with different parallaxes. For example, each of the repeat units U includes a first display element to an $n^{th}$ display element, and the first display element to the $n^{th}$ display element display the same object with gradually changing parallaxes, wherein n is a positive integer. In the present embodiment, n is a multiple of 3, for example, n is 12. Each of the repeat units U includes a first display element 1 to a twelfth display element 12 displaying the same object with different parallaxes. The first display element 1 to the twelfth display element 12 of each of the repeat units U is capable of displaying the same object with different view angles. For example, the first display element 1 to the twelfth display element 12 display a point on an object respectively with different view angles.

In the present embodiment, the first display element 1 to the twelfth display element 12 are, for example, pixels or sub-pixels. For example, the first display element 1 to the twelfth display element 12 may be sub-pixels respectively displaying single colors or may also be pixels respectively including red, blue and green sub-pixels.

At least two of the display elements displaying the same object with the closest parallax are not connected with each other. In the present embodiment, the second display element 2 and the first display element 1 display the same object with the closet parallax, and so do the second display element 2 and the third display element 3, wherein the second display element 2 and the first display element 1 are not connected with each other, and the second display element 2 and the third display element 3 are not connected with each other. The fourth display element 4 and the third display element 3 display the same object with the closet parallax, and so do the fourth display element 4 and the fifth display element 5, wherein the fourth display element 4 and the third display element 3 are not connected with each other, and the fourth display element 4 and the fifth display element 5 are not connected with each other. The sixth display element 6 and the fifth display element 5 display the same object with the closet parallax, and so do the sixth display element 6 and the seventh display element 7, wherein the sixth display element 6 and the fifth display element 5 are not connected with each other, and the sixth display element 6 and the seventh display element 7 are not connected with each other. The eighth display element 8 and the seventh display element 7 display the same object with the closet parallax, and so do the eighth display element 8 and the ninth display element 9, wherein the eighth display element 8 and the seventh display element 7 are not connected with each other, and the eighth display element 8 and the ninth display element 9 are not connected with each other. The tenth display element 10 and the ninth display element 9 display the same object with the closet parallax, and so do the tenth display element 10 and the eleventh display element 11, wherein the tenth display element 10 and the ninth display element 9 are not connected with each other, and the tenth display element 10 and the eleventh display element 11 are not connected with each other. The twelfth display element 12 and the eleventh display element 11 display the same object with the closet parallax, wherein the twelfth display element 12 and the eleventh display element 11 are not connected with each other.

In the present embodiment, each of the repeat units U includes a first region R1, a second region R2 and a third region R3 which are sequentially arranged. The number of the display elements disposed in the first region R1, the number of the display elements disposed in the second region R2 and the number of the display elements disposed in the third region R3 are all odd numbers or all even numbers.

Among the first display element to the $n^{th}$ display element, the $(1+3X)^{th}$ display element is disposed in the first region R1, the $(2+3X)^{th}$ display element is disposed in the second region R2, the $(3+3X)^{th}$ display element is disposed in the third region R3, and X is 0 to $((n/3)-1)$. For example, n is 12, and X is 0 to 3. The first display element 1, the fourth display element 4, the seventh display element 7 and the tenth display element 10 are sequentially disposed in the first region R1, the second display element 2, the fifth display element 5, the eighth display element 8 and the eleventh display element 11 are sequentially disposed in the second region R2, and the third display element 3, the sixth display element 6, the ninth display element 9 and the twelfth display element 12 are sequentially disposed in the third region R3.

The width W2 of each of the repeat units U is approximately equal to the sum of the width W1 of each of the display elements in each of the repeat units U. In the present embodiment, each of the repeat units U includes the first display element to the twelfth display element 12, the width W1 of each of the first display element to the twelfth display element 12 is equal to one another, and the width W2 of each of the repeat units U is approximately equal to 12 times of the width W1. In the present embodiment, widths of the first region R1 to the third region R3 are equal to one another, for example, 4 times of the width W1.

In the present embodiment, the first region R1 to the third region R3 respectively overlap with the first light transmission area T1 to the third light transmission area T3 of the optical layer O. A center of the first region R1 does not overlap with a center of the first light transmission area T1, a center of the second region R2 overlaps with a center of the second light transmission area T2, and a center of the third region R3 does not overlap with a center of the third light transmission area T3.

In the present embodiment, a distance between the center of the first region R1 and the center of the second region R2 (which is approximately equal to 4 times of the width W1) is greater than a distance P1 between the center of the first light transmission area T1 and the center of the second light transmission area T2, and a distance between the center of the third region R3 and the center of the second region R2 (which is approximately equal to 4 times of the width W1) is greater than a distance P2 between the center of the third light transmission area T3 and the center of the second light transmission area T2. The distance P1 is approximately equal to the distance P2. In some embodiments, the distance P1 is approximately equal to $((n/3)-0.33)$ times of the width W1. For example, the distance P1 is approximately equal to 3.67 times of the width W1.

A distance between the center of the third light transmission area T3 overlapping with one of the repeat units U and the center of the first light transmission area T1 overlapping with another one of the repeat units U adjacent to the one of the repeat units is P3. In the present embodiment, the distance P3 is greater than the distance P1 and greater than the distance P2. In some embodiments, the distance P3 is approximately equal to $((n/3)+0.67)$ times of the width W1. For example, the distance P3 is approximately equal to 4.67 times of the width W1.

In the present embodiment, the first display element 1 to the twelfth display element 12 respectively emit lights L1 to L12. After the light L1, the light L4, the light L7 and the light L10 emitted by the first display element 1, the fourth display element 4, the seventh display element 7 and the tenth display element 10 pass through the first light transmission area T1, the light L1, the light L4, the light L7 and the light L10 respectively move forward along a direction E1, a direction E4, a direction E7 and a direction E10. After the light L2, the light L5, the light L8 and the light L11 emitted by the second display element 2, the fifth display element 5, the eighth display element 8 and the eleventh display element 11 pass through the second light transmission area T2, the light L2, the light L5, the light L8 and the light L11 respectively move forward along a direction E2, a direction E5, a direction E8, and a direction E11. After the light L3, the light L6, the light L9 and the light L12 emitted by the third display element 3, the sixth display element 6, the ninth display element 9 and the twelfth display element 12 pass through the third light transmission area T3, the light L3, the light L6, the light L9 and the light L12 respectively move forward along a direction E3, a direction E6, a direction E9 and a direction E12. The directions E1 to E12 are different from one another. In the present embodiment, after the display device 20 is provided, the first display element 1 to the twelfth display element 12 display the same object with different parallaxes, thereby obtaining the 3D stereoscopic image information. In the present embodiment, the first display element 1 to the twelfth display element 12 display the same object with gradually changing parallaxes, and the directions E1 to E12 are light-emitting directions with gradually changing light-emitting angles.

Based on the above, each of the repeat units U of the display device 20 includes the first display element 1 to the twelfth display element 12 displaying the same object with different parallaxes, and one repeat unit U overlaps with three or more light transmission areas, and in comparison with another display device in which one repeat unit overlaps with only one light transmission area, the display device 20 of the present embodiment has a higher resolution.

Figure 3:
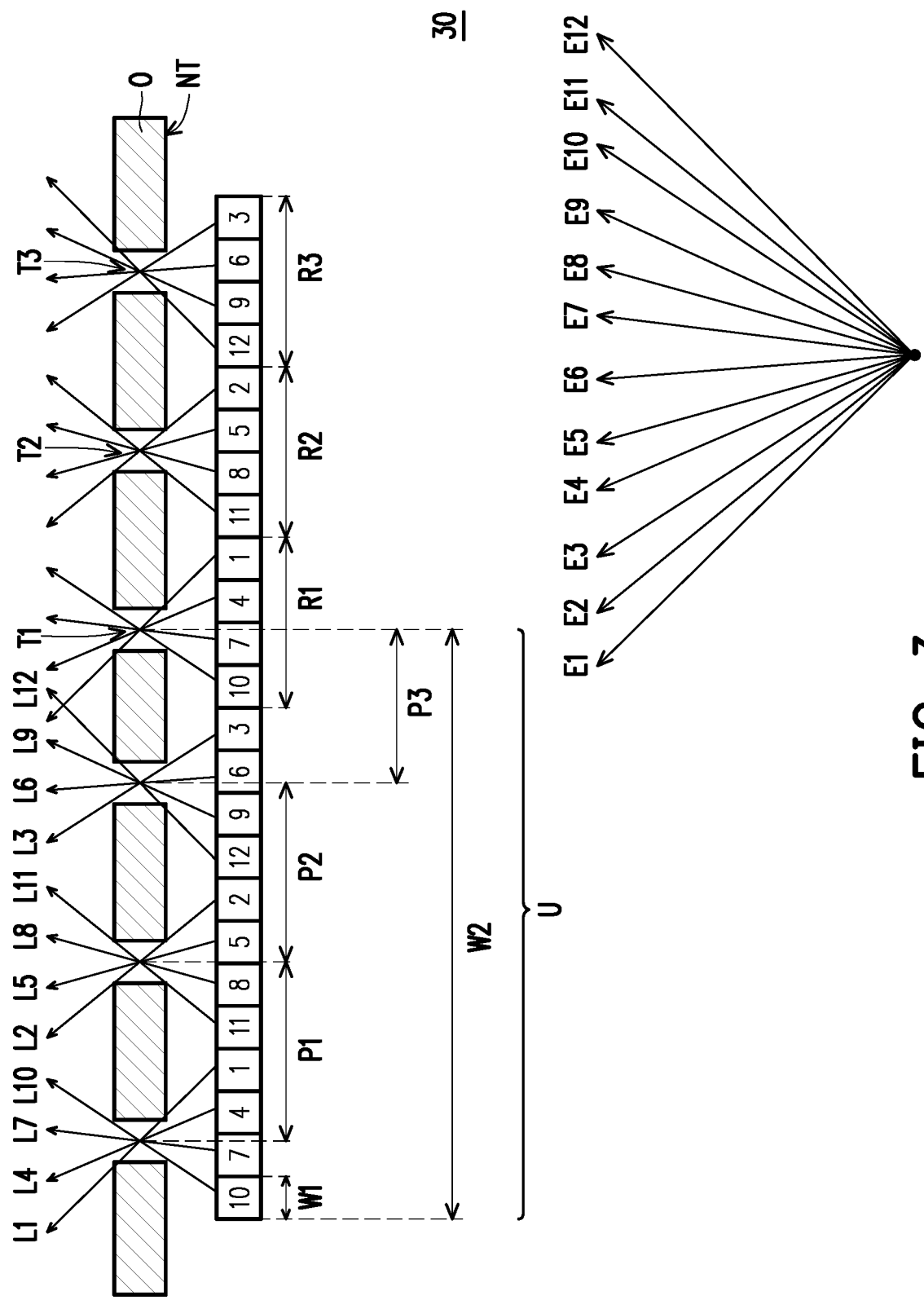
FIG. 3 is a schematic cross-sectional diagram illustrating a display device according to an embodiment of the invention.

FIG. 3 is a schematic cross-sectional diagram illustrating a display device according to an embodiment of the invention. It should be noted that element numbers and part of the contents related to the previous embodiment illustrated in FIG. 2 are referenced in the present embodiment illustrated in FIG. 3, where the same or similar elements are represented by using the same or similar reference numerals, the description with respect to the same technical content is omitted. Regarding the detailed description of the omitted parts, reference may be found in the previous embodiment and will not be repeated below.

A display device 30 illustrated in FIG. 3 is mainly different from the display device 20 illustrated in FIG. 2 in that a distance P1 to a distance P3 of the display device 30 are different from the distance P1 to the distance P3 of the display device 20.

Referring to FIG. 3, the distance between the center of the first region R1 and the center of the second region R2 (which is approximately equal to 4 times of the width W1) is smaller than the distance P1 between the center of the first light transmission area T1 and the center of the second light transmission area T2, and the distance between the center of the third region R3 and the center of the second region R2 (which is approximately equal to 4 times of the width W1) is smaller than the distance P2 between the center of the third light transmission area T3 and the center of the second light transmission area T2. The distance P1 is approximately equal to the distance P2. In some embodiments, the distance P1 is approximately equal to $((n/3)+0.33)$ times of the width W1. For example, the distance P1 is approximately equal to 4.33 times of the width W1.

The distance between the center of the third light transmission area T3 overlapping with one of the repeat units U and the center of the first light transmission area T1 overlapping with another one of the repeat units U adjacent to the one of the repeat units is P3. In the present embodiment, the distance P3 is greater than the distance P1 and greater than the distance P2. In some embodiments, the distance P3 is approximately equal to $((n/3)-0.67)$ times of the width W1. For example, the distance P3 is approximately equal to 3.33 times of the width W1.

To sum up, each of the repeat units U of the display device 30 includes the first display element 1 to the twelfth display element 12 displaying the same object with different parallaxes, and one repeat unit U overlaps with three or more light transmission areas, and in comparison with another display device in which one repeat unit overlaps with only one light transmission area, the display device 30 of the present embodiment has a higher resolution.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A display device, comprising:
a plurality of repeat units, wherein each of the repeat units comprises a plurality of display elements displaying a same object with different parallaxes, and at least two of the display elements displaying the same object with the closest parallax are not connected with each other; and
an optical layer, disposed on the repeat units, and the optical layer having a plurality of light transmission areas and a light non-transmission area around the light transmission areas, wherein each of the repeat units overlaps with two or more light transmission areas,
wherein each of the repeat units comprises a first display element to an nth display element, and the first display element to the nth display element display the same object with gradually changing parallaxes, wherein n is a positive integer, n is a multiple of 3, and among the first display element to the $n^{th}$ display element, the $(1+3X)^{th}$ display element is disposed in a first region, the $(2+3X)^{th}$ display element is disposed in a second region, the $(3+3X)^{th}$ display element is disposed in a third region, and X is 0 to $((n/3)-1)$, wherein a center of the second region overlaps with a center of a second light transmission area of the optical layer,
wherein the first region, the second region and the third region respectively overlap with a first light transmission area, the second light transmission area and a third light transmission area of the optical layer, a distance between a center of the first light transmission area and the center of the second light transmission area is P1, a distance between a center of the third light transmission area and the center of the second light transmission area is P2, and P1 is approximately equal to P2,
wherein P1 is approximately equal to $((n/3)-0.33)$ or $((n/3)+0.33)$ times of a width W1, and the width W1 is a width of each of the display elements.

2. The display device according to claim 1, wherein when P1 is approximately equal to $((n/3)-0.33)$ times of the width W1, a distance between the center of the third light transmission area overlapping with one of the repeat units and the center of the first light transmission area overlapping with another one of the repeat units adjacent to the one of the repeat units is P3, and P3 is greater than P1.

3. The display device according to claim 2, wherein P3 is approximately equal to $((n/3)+0.67)$ times of the width W1.

4. The display device according to claim 1, wherein when P1 is approximately equal to $((n/3)+0.33)$ times of the width W1, a distance between the center of one of the plurality of the third light transmission areas that overlaps with one of the repeat units and the center of one of the plurality of the first light transmission areas that overlaps with another one of the repeat units adjacent to the one of the repeat units is P3, and P3 is smaller than P1.

5. The display device according to claim 4, wherein P3 is approximately equal to $((n/3)-0.67)$ times of the width W1.

6. A display method of a display device, comprising:
providing a display device, and the display device comprising:
a plurality of repeat units, each of the repeat units comprising a plurality of display elements; and
an optical layer, disposed on the repeat units, and the optical layer having a plurality of light transmission areas and a light non-transmission area around the light transmission areas, wherein each of the repeat units overlaps with two or more light transmission areas; and displaying a same object respectively with different parallaxes by the display elements in each of the repeat units, wherein at least two of the display elements displaying the same object with the closest parallax are not connected with each other, wherein each of the repeat units comprises a first display element to an nth display element, and the first display element to the $n^{th}$ display element display the same object with gradually changing parallaxes, wherein n is a positive integer, n is a multiple of 3, and among the first display element to the nth display element, the $(1+3X)^{th}$ display element is disposed in a first region, the $(2+3X)^{th}$ display element is disposed in a second region, the $(3+3X)^{th}$ display element is disposed in a third region, and X is 0 to $((n/3)-1)$, wherein a center of the second region overlaps with a center of a second light transmission area of the optical layer, wherein the first region, the second region and the third region respectively overlap with a first light transmission area, the second light transmission area and a third light transmission area of the optical layer, a distance between a center of the first light transmission area and the center of the second light transmission area is P1, a distance between a center of the third light transmission area and the center of the second light transmission area is P2, and P1 is approximately equal to P2, wherein P1 is approximately equal to $((n/3)-0.33)$ or $((n/3)+0.33)$ times of a width W1, and the width W1 is a width of each of the display elements.

7. The display method according to claim 6, wherein when P1 is approximately equal to $((n/3)-0.33)$ times of the width W1, a distance between the center of the third light transmission area overlapping with one of the repeat units and the center of the first light transmission area overlapping with another one of the repeat units adjacent to the one of the repeat units is P3, and P3 is greater than P1.

8. The display method according to claim 7, wherein P3 is approximately equal to $((n/3)+0.67)$ times of the width W1.

9. The display method according to claim 6, wherein when P1 is approximately equal to $((n/3)+0.33)$ times of the width W1, a distance between the center of one of the plurality of the third light transmission areas that overlaps with one of the repeat units and the center of one of the plurality of the first light transmission areas that overlaps with another one of the repeat units adjacent to the one of the repeat units is P3, and P3 is smaller than P1.

10. The display method according to claim 9, wherein P3 is approximately equal to $((n/3)-0.67)$ times of the width W1.

11. A display device, comprising:
a plurality of repeat units, wherein each of the repeat units comprises a plurality of display elements displaying a same object with different parallaxes, and at least two of the display elements displaying the same object with the closest parallax are not connected with each other; and
an optical layer, disposed on the repeat units, and the optical layer having a plurality of light transmission areas and a light non-transmission area around the light transmission areas, wherein each of the repeat units overlaps with two or more light transmission areas,
wherein each of the repeat units comprises a first display element to an nth display element, and the first display element to the $n^{th}$ display element display the same object with gradually changing parallaxes, wherein n is a positive integer, n is a multiple of 3, and among the first display element to the nth display element, the $(1+3X)^{th}$ display element is disposed in a first region, the $(2+3X)^{th}$ display element is disposed in a second region, the $(3+3X)^{th}$ display element is disposed in a third region, and X is 0 to $((n/3)-1)$, wherein a center of the second region overlaps with a center of a second light transmission area of the optical layer,
wherein the first region, the second region and the third region respectively overlap with a first light transmission area, the second light transmission area and a third light transmission area of the optical layer, a distance between a center of the first light transmission area and the center of the second light transmission area is P1, a distance between a center of the third light transmission area and the center of the second light transmission area is P2, and P1 is approximately equal to P2,
wherein a distance between the center of the third light transmission area overlapping with one of the repeat units and the center of the first light transmission area overlapping with another one of the repeat units adjacent to the one of the repeat units is P3,
wherein P3 is greater than P1 and approximately equal to $((n/3)+0.67)$ times of a width W1 or is smaller than P1 and approximately equal to $((n/3)-0.67)$ times of the width W1, and the width W1 is a width of each of the display elements.

12. A display method of a display device, comprising:
providing a display device, and the display device comprising:
a plurality of repeat units, each of the repeat units comprising a plurality of display elements; and
an optical layer, disposed on the repeat units, and the optical layer having a plurality of light transmission areas and a light non-transmission area around the light transmission areas, wherein each of the repeat units overlaps with two or more light transmission areas; and
displaying a same object respectively with different parallaxes by the display elements in each of the repeat units, wherein at least two of the display elements displaying the same object with the closest parallax are not connected with each other,
wherein each of the repeat units comprises a first display element to an $n^{th}$ display element, and the first display element to the nth display element display the same object with gradually changing parallaxes, wherein n is a positive integer, n is a multiple of 3, and among the first display element to the nth display element, the $(1+3X)^{th}$ display element is disposed in a first region, the $(2+3X)^{th}$ display element is disposed in a second region, the $(3+3X)^{th}$ display element is disposed in a third region, and X is 0 to $((n/3)-1)$, wherein a center of the second region overlaps with a center of a second light transmission area of the optical layer,
wherein the first region, the second region and the third region respectively overlap with a first light transmission area, the second light transmission area and a third light transmission area of the optical layer, a distance between a center of the first light transmission area and the center of the second light transmission area is P1, a distance between a center of the third light transmission area and the center of the second light transmission area is P2, and P1 is approximately equal to P2,
wherein a distance between the center of the third light transmission area overlapping with one of the repeat units and the center of the first light transmission area overlapping with another one of the repeat units adjacent to the one of the repeat units is P3, wherein P3 is greater than P1 and approximately equal to ((n/3)+0.67) times of a width W1 or is smaller than P1 and approximately equal to ((n/3)−0.67) times of a width W1, and the width W1 is a width of each of the display elements.

\* \* \* \* \*